US012792589B2

(12) United States Patent
Singh et al.

(10) Patent No.: US 12,792,589 B2
(45) Date of Patent: Nov. 10, 2026

(54) SYSTEM AND METHOD FOR MANAGEMENT OF POST DATA MIGRATION

(71) Applicant: Onix Networking Corp., New York, NY (US)

(72) Inventors: Sanjay Singh, Lawrence Township, NJ (US); Patrick Schablitzki, Corte Madera, CA (US); Ramnish Singh, Sammamish, WA (US); Jay Jambotkar, Redmond, WA (US); Anantha Balasubramanian, Bangalore (IN); Balaji Ramakrishnan, Hyderabad (IN); Rajesh Kannan, Bangalore (IN)

(73) Assignee: Onix Networking Corp, New York, NY (US)

( * ) Notice: Subject to any disclaimer, the term of this patent is extended or adjusted under 35 U.S.C. 154(b) by 205 days.

(21) Appl. No.: 18/755,967

(22) Filed: Jun. 27, 2024

(65) Prior Publication Data

US 2026/0003851 A1 Jan. 1, 2026

(51) Int. Cl.
*G06F 16/23* (2019.01)
*G06F 16/21* (2019.01)

(52) U.S. Cl.
CPC ........ *G06F 16/2365* (2019.01); *G06F 16/214* (2019.01)

(58) Field of Classification Search
None
See application file for complete search history.

(56) References Cited

U.S. PATENT DOCUMENTS

| | | | | |
|---|---|---|---|---|
| 10,496,291 | B2 * | 12/2019 | Badrinarayanan | G06F 21/64 |
| 10,896,160 | B2 * | 1/2021 | Denyer | G06F 16/214 |
| 11,269,822 | B2 * | 3/2022 | Fabijancic | G06F 16/212 |
| 12,204,505 | B1 * | 1/2025 | Singh | G06F 16/214 |
| 12,399,872 | B2 * | 8/2025 | Jin | G06F 11/3457 |
| 12,418,555 | B1 * | 9/2025 | Skarphedinsson | G06F 9/45533 |
| 2013/0339943 | A1 * | 12/2013 | Mallya | G06F 16/214 717/176 |
| 2015/0074053 | A1 * | 3/2015 | Sarferaz | G06F 16/283 707/634 |

(Continued)

*Primary Examiner* — Sherief Badawi
*Assistant Examiner* — Jessica N Le
(74) *Attorney, Agent, or Firm* — Jason C. Cameron

(57) ABSTRACT

A system and method for management of post migration is provided. The system includes a data acquisition module to receive a plurality of inputs as a result of post migration. The system also includes a chatbot module to provide on-demand support to a user during and post the migration and a documentation and reporting module to generate a document and report of the migration using an artificial intelligence model. Further, the system includes an improvement module to perform a continuous improvement loop after each stage of the migration to analyze the efficiency of the migration and provide corrective actions. Furthermore, the system includes a fine-tuning module configured to fine-tune the process for subsequent migration waves. Moreover, the system includes an optimization module to constantly analyze a cloud platform environment to identify areas for improvement, such as right-sizing instances, optimizing storage, adjusting configurations based on usage patterns thereby managing post migration.

17 Claims, 4 Drawing Sheets

(56) References Cited

U.S. PATENT DOCUMENTS

| | | | | |
|---|---|---|---|---|
| 2019/0182323 | A1* | 6/2019 | Srinivasan | G06F 9/5072 |
| 2019/0288915 | A1* | 9/2019 | Denyer | G06F 16/252 |
| 2019/0384634 | A1* | 12/2019 | Nanduru | G06F 9/5038 |
| 2020/0233600 | A1* | 7/2020 | Swamy | G06F 3/067 |
| 2020/0264919 | A1* | 8/2020 | Vukovic | G06N 20/00 |
| 2021/0133234 | A1* | 5/2021 | Bedadala | G06F 16/90332 |
| 2021/0174280 | A1* | 6/2021 | Ratnapuri | G06Q 10/06315 |
| 2021/0263899 | A1* | 8/2021 | Marappagounder | G06F 40/205 |
| 2022/0004428 | A1* | 1/2022 | Sun | G06F 9/4875 |
| 2022/0043785 | A1* | 2/2022 | Nadimpalli | G06F 3/0647 |
| 2023/0196237 | A1 | 6/2023 | Ratnapuri | |
| 2023/0401138 | A1* | 12/2023 | Sharma | G06F 11/3457 |

* cited by examiner

SYSTEM AND METHOD FOR MANAGEMENT OF POST DATA MIGRATION

FIELD OF INVENTION

Embodiments of the present disclosure relate to the field of data migration, and more particularly, a system and a method for management of post data migration.

BACKGROUND

Typically, data migration is essential when an organization upgrades or merges existing systems, changes operating systems where the database resides or transfers data between locations. However, this process is saturated with costs and obstacles. For this reason, a user (or an expert) monitors the process and intervenes to resolve problems that arise. Nevertheless, the user who is accountable for implementing the data migration, at times fails to follow instructions, misses alerts or may simply implement the data migration maliciously. Consequently, such activities can have a negative impact on the process, resulting in loss of data, system resources and additional cost of money and manpower. Additionally, the source system can also be challenged with the negative impact in terms of its features.

Data migration can be complex and challenging based on the volume of data transferred from one storage or computer system to another. It is crucial to ensure that data remains consistent, available and usable after the migration process is complete. Consequently, post-migration activities are essential to ensure a smooth operation in the new storage or computer system. These activities include validating the migrated data, optimizing system performance, training users and addressing post-migration issues that might have been raised.

Identifying the errors that occurred during migration remains a challenge due to the size and complexity of the migration. Additionally, analyzing these errors and providing remediation plans is a demanding task.

Hence, there is a need for an improved system and method for management of post data migration which addresses the aforementioned issue(s).

OBJECTIVE OF THE INVENTION

An objective of the present invention is to summarize and analyze the migration activities to identify one or more errors.

Another objective of the present invention is to provide measures to prevent occurrence of one or more errors in future migration activities.

Yet another objective of the present invention is to constantly update the one or more errors and corresponding measures.

BRIEF DESCRIPTION

In accordance with an embodiment of the present disclosure, a computer-implemented system for management of post data migration is provided. The computer-implemented system includes a hardware processor and a memory coupled to the hardware processor. The memory comprises a set of program instructions in the form of a processing subsystem hosted on a server and configured to execute on a network to control bidirectional communications among a plurality of modules. The processing subsystem includes a data acquisition module configured to receive a plurality of inputs due to post migration. The plurality of inputs comprises infrastructure inventory, application logs, application configuration, database inventory, database logs, security and compliance report and backup configuration report. The processing subsystem also includes a chatbot module operatively coupled to the data acquisition module wherein the chatbot sub module is configured to provide on-demand support to a user during and post the migration. Further, the processing subsystem includes a documentation and reporting module operatively coupled to the chatbot module wherein the documentation and reporting submodule is configured to generate a document and report of the migration using an artificial intelligence model. Furthermore, the processing subsystem includes an improvement module operatively coupled to the error analysis module wherein the improvement sub module is configured to perform a continuous improvement loop after each stage of the migration to analyze the efficiency of the migration and provide corrective actions. Moreover, the processing subsystem includes a fine-tuning module operatively coupled to the improvement module wherein the fine-tuning module is configured to fine-tune the process for subsequent migration waves. The processing subsystem also includes an optimization module operatively coupled to the fine-tuning module wherein the optimization sub module is configured to constantly analyze a cloud platform environment to identify areas for improvement, such as right-sizing instances, optimizing storage, and adjusting configurations based on usage patterns thereby managing post migration.

In accordance with an embodiment of the present disclosure, a computer-implemented method for management of post data migration is provided. The computer-implemented method includes receiving, by a data acquisition module of a processing subsystem, a plurality of inputs as a result of post migration wherein the plurality of inputs comprises infrastructure inventory, application logs, application configuration, database inventory, database logs, security and compliance report and backup configuration report. The computer-implemented method includes providing, by a chatbot module of the processing subsystem, on-demand support to a user during and post the migration. Further, the computer-implemented method includes generating, by a document and reporting module of the processing subsystem, a document and report of the migration using an artificial intelligence model. Furthermore, the computer-implemented method includes performing, by an improvement module of the processing subsystem, a continuous improvement loop after each stage of the migration to analyze the efficiency of the migration and provide corrective actions. Moreover, the computer-implemented method includes fine-tuning, by a fine-tuning module of the processing subsystem, the process for subsequent migration waves. The computer-implemented method also includes analyzing, by an optimization module of the processing subsystem, a cloud platform environment to identify areas for improvement, such as right-sizing instances, optimizing storage, and adjusting configurations based on usage patterns thereby managing post migration.

In accordance with another embodiment of the present disclosure, a non-transitory computer-readable medium storing a computer program that, when executed by a processor, causes the processor to perform a computer-implemented method for management of post data migration is provided. The computer-implemented method includes receiving, by a data acquisition module of a processing subsystem, a plurality of inputs as a result of post migration wherein the plurality of inputs comprises infrastructure inventory, application logs, application configuration, database inventory, database logs, security and compliance report and backup configuration report. The computer-implemented method includes providing, by a chatbot module of the processing subsystem, on-demand support to a user during and post the migration. Further, the computer-implemented method includes generating, by a document and reporting module of the processing subsystem, a document and report of the migration using an artificial intelligence model. Furthermore, the computer-implemented method includes performing, by an improvement module of the processing subsystem, a continuous improvement loop after each stage of the migration to analyze the efficiency of the migration and provide corrective actions. Moreover, the computer-implemented method includes fine-tuning, by a fine-tuning module of the processing subsystem, the process for subsequent migration waves. The computer-implemented method also includes analyzing, by an optimization module of the processing subsystem, a cloud platform environment to identify areas for improvement, such as right-sizing instances, optimizing storage, and adjusting configurations based on usage patterns thereby managing post migration.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
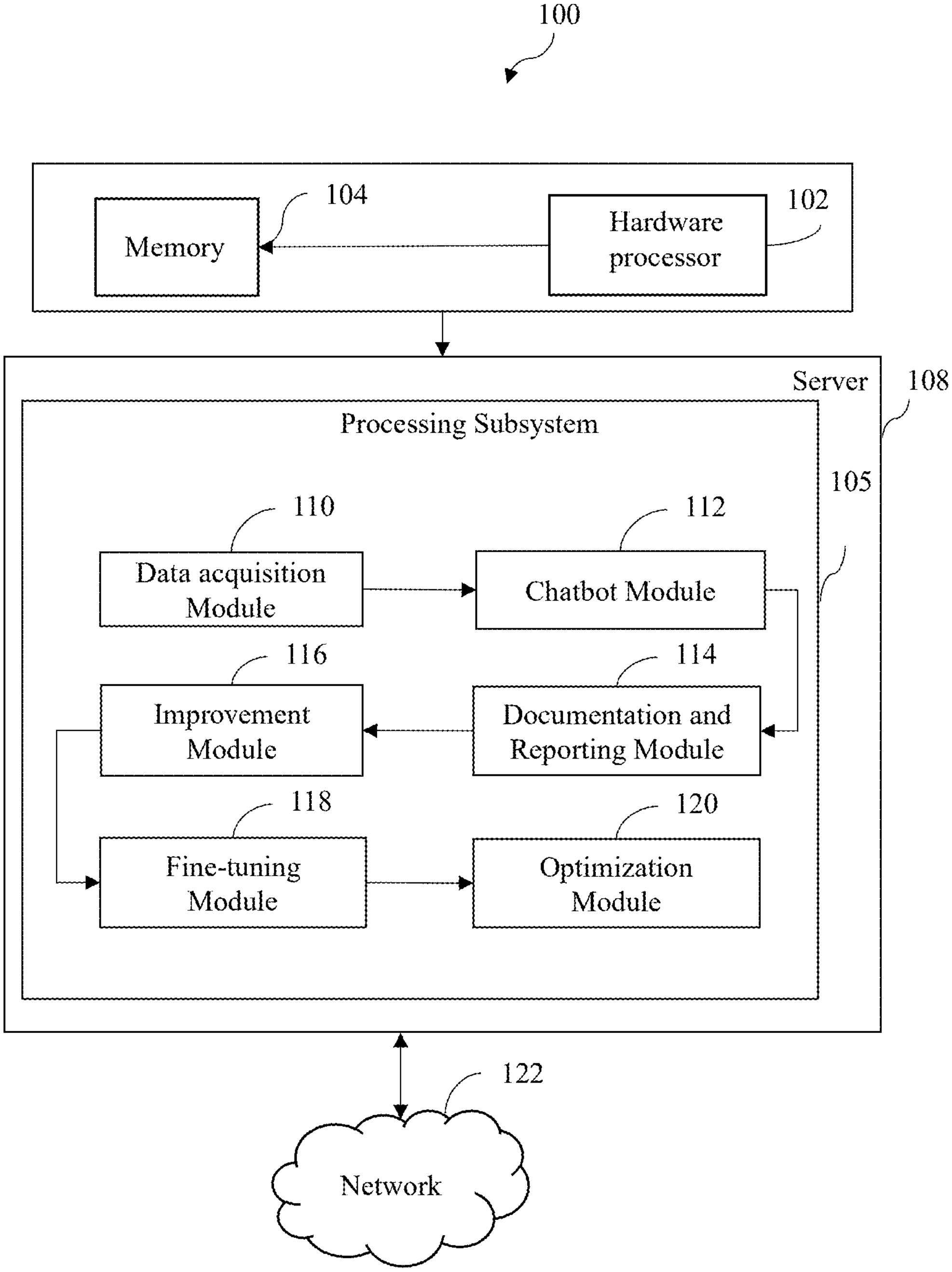
FIG. 1 is a block diagram representation of a computer-implemented system for managing post data migration in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation on the scope of disclosure is thus intended. Such alterations and further modifications in the illustrated computer-implemented system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

In accordance with an embodiment of the present disclosure, a computer-implemented system for managing post data migration is provided. The computer-implemented system includes a hardware processor and a memory coupled to the hardware processor. The memory comprises a set of program instructions in the form of a processing subsystem hosted on a server and configured to execute on a network to control bidirectional communications among a plurality of modules. The processing subsystem includes a data acquisition module configured to receive a plurality of inputs due to post migration. The plurality of inputs comprises infrastructure inventory, application logs, application configuration, database inventory, database logs, security and compliance report and backup configuration report. The processing subsystem also includes a chatbot module operatively coupled to the data acquisition module wherein the chatbot sub module is configured to provide on-demand support to a user during and post the migration. Further, the processing subsystem includes a documentation and reporting module operatively coupled to the chatbot module wherein the documentation and reporting submodule is configured to generate a document and report of the migration using an artificial intelligence model. Furthermore, the processing subsystem includes an improvement module operatively coupled to the error analysis module wherein the improvement sub module is configured to perform a continuous improvement loop after each stage of the migration to analyze the efficiency of the migration and provide corrective actions. Moreover, the processing subsystem includes a fine-tuning module operatively coupled to the improvement module wherein the fine-tuning module is configured to fine-tune the process for subsequent migration waves. The processing subsystem also includes an optimization module operatively coupled to the fine-tuning module wherein the optimization sub module is configured to constantly analyze a cloud platform environment to identify areas for improvement, such as right-sizing instances, optimizing storage, and adjusting configurations based on usage patterns thereby managing post migration.

FIG. 1 is a block diagram representation of a computer-implemented system for managing post data migration in accordance with an embodiment of the present disclosure. The computer-implemented system 100 includes a hardware processor 102 and a memory 104 coupled to the hardware processor 102. The memory 104 includes a set of program instructions in the form of a processing subsystem 105 and configured to be executed by the hardware processor 102. As used herein, the hardware processor performs data processing, decision making and all general computing tasks and coordinates tasks done by memory, disk storage and other system components. The processing subsystem 105 is hosted on a server 108. In one embodiment, server 108 may include a cloud server. In another embodiment, the server 108 may include a local server. The processing subsystem 105 is configured to execute on a network 122 to control bidirectional communications among a plurality of modules.

In one embodiment, the network 122 may include a wired network such as a local area network (LAN) or Wide Area Network (WAN), such as the Internet. In another embodiment, the network 122 may include both wired and wireless communications according to one or more standards and/or via one or more transport mediums. In one example, the network 122 may include wireless communications according to one of the 802.11 or Bluetooth specification sets, or another standard or proprietary wireless communication protocol. In yet another embodiment, the network 122 may also include communications over a terrestrial cellular network, including, a global system for mobile communications (GSM), code division multiple access (CDMA), and/or enhanced data for global evolution (EDGE) network. Further, the plurality of modules includes the data acquisition module 110, a chatbot module 112, a documentation and reporting module 114, improvement module 116, a fine-tuning module 118 and an optimization module 120.

The data acquisition module 110 is configured to receive a plurality of inputs as a result of post data migration. The plurality of inputs includes infrastructure inventory, application logs, application configuration, database inventory, database logs, security and compliance report and backup configuration report. It must be noted that the said plurality of inputs are the result or output of data migration. As used herein, data migration may be defined as a process of moving one or more applications and associated data from on-premises infrastructure or one cloud environment to another. Infrastructure inventory refers to a list of applications, servers, virtual machines and other assets that are currently used in the organization. Application logs refers to the detailed information about the configurations and settings of each application and server.

Typically, the plurality of inputs are received from one or more resources. In one embodiment, the one or more resources may include one or more applications, one or more second servers, directory services, email systems and data. In one embodiment, the plurality of inputs can be obtained without having a person manually perform operations at a source system. In a preferred embodiment, the plurality of inputs are received from an integrated database 128. The integrated database 128 is accountable for storing inventory and logs of the data migrations. In some embodiments, the integrated database 128 may include a structured query language database. In a specific embodiment, the integrated database 128 may include a non-structured query language database. In one embodiment, the integrated database 128 may include a columnar database. Additionally, in one embodiment, the integrate database 128 may be implemented as a non-transitory data structure stored on a local memory device, such as a hard drive, Solid State Drive (SSD), flash memory, and the like, or may be stored as a part of a cloud network, as described herein.

The chatbot module 112 operatively coupled to the data acquisition module 110 wherein the chatbot sub module 112 is configured to provide on-demand support to a user during and post the migration. Typically, a chatbot is a computer program and specialized computer hardware that simulates human conversation as if responding to database queries, database commands and user requests. A user can access the chatbot on a user device. Examples of the user device includes, but is not limited to, a mobile phone, desktop computer, portable digital assistant (PDA), smart phone, tablet, ultra-book, netbook, laptop, multi-processor system, microprocessor-based or programmable consumer electronic system, or any other communication device that a user may use.

In some embodiments, the computer-implemented system may comprise a display module (not shown) to display information (for example, in the form of user interfaces). The display module is configured to display a graphical user interface (GUI). Additionally, the display module may be passive or active, adapted to allow a user to view and interact with the GUI. In one embodiment, the display module may be a touch screen display responsive to touches, gestures, swipes, and the like for use in interacting with and manipulating the GUI by a user thereof. Further, gestures may include single gestures, multi-touch gestures, and other combinations of gestures and user inputs adapted to facilitate a user in migrating software code.

In further embodiments, the computer-implemented system may comprise one or more of touch screens, accelerometers, gyroscopes, cameras, microphones, global positioning system (GPS) devices, and so forth. Further, examples of the web browser includes, but is not limited to, Microsoft Edge, Internet Explorer, Google Chrome, Mozilla Firefox, and Apple Safari. For instance, the user can ask the chatbot to show "errors that occurred during migration" and the chatbot can respond with a list of errors. In one embodiment, the chatbot provides the user with a platform for conversing and interacting with an integrated database to retrieve various information related to the errors during migration, reports and documents pertaining to the said errors.

Additionally, in one embodiment the chatbot module 112 is configured to constantly provide answers to queries, documentations and assists the user with a plurality of tasks.

The documentation and reporting module 114 is operatively coupled to the chatbot module 112 wherein the documentation and reporting submodule 114 is configured to generate a document and report of the data migration activities using an artificial intelligence model. Specifically, the artificial intelligence model is a generative artificial intelligence (Generative AI) model. In one embodiment, the artificial intelligence model is a Large Language Model (LLM). The LLM is an advanced Artificial Intelligence (AI) model that is trained on vast amounts of data thereby enabling them to understand and generate human-like text. It must be noted that the artificial intelligence model is trained with past data migrations and domain-specific knowledge to create insights for making precise predictions and recommendations.

Typically, the document and report of the migration comprises timelines, resource configurations and performance metrics. Additionally, the document and report includes, but is not limited to, migration report, error report, fine tuning report, security and compliance report, resource configurations and retrospective analysis. In one embodiment, an on-demand chat interface is configured to display the said document and report. In one embodiment, the document and report can be in the form of email, graphic display and the like.

In one embodiment, the document and report are stored in the integrated database 128.

The improvement module 116 is operatively coupled to the documentation and reporting module 114 wherein the improvement sub module 116 is configured to perform a continuous improvement loop after each stage of the migration to analyze the efficiency of the migration and provide corrective actions. For instance, some data migrations can be done efficiently in a single stage (also referred to as 'cutover') with a small number of users. On the other hand, several other data migrations can be done in multiple stages with a large number of users. In each of these cases, the improvement module 116 analyzes the migration at each stage to determine its efficiency.

The fine-tuning module 118 is operatively coupled to the improvement module 116 wherein the fine-tuning module 118 is configured to fine-tune the process for subsequent migration waves. In one embodiment, the fine-tuning of subsequent migration waves is based on size of the migration wave, complexity of the migration wave, available resources and requirements of a destination environment.

The optimization module 120 is operatively coupled to the fine-tuning module 118 wherein the optimization sub module 120 is configured to constantly analyze a cloud platform environment to identify areas for improvement, such as right-sizing instances, optimizing storage, and adjusting configurations based on usage patterns thereby managing post migration. In one embodiment, the optimization module 120 is configured to constantly review the data migration at pre-determined time intervals. In such an embodiment, the optimization module 120 is configured to make one or more changes based on the review.

In one embodiment, the various functional components of the computer-implemented system may reside on a single computer, or they may be distributed across several computers in various arrangements. The various components of the computer-implemented system may, furthermore, access one or more databases, and each of the various components of the computer-implemented system may be in communication with one another. Further, while the components of FIG. 1 are discussed in the singular sense, it will be appreciated that in other embodiments multiple instances of the components may be employed.

Figure 2:
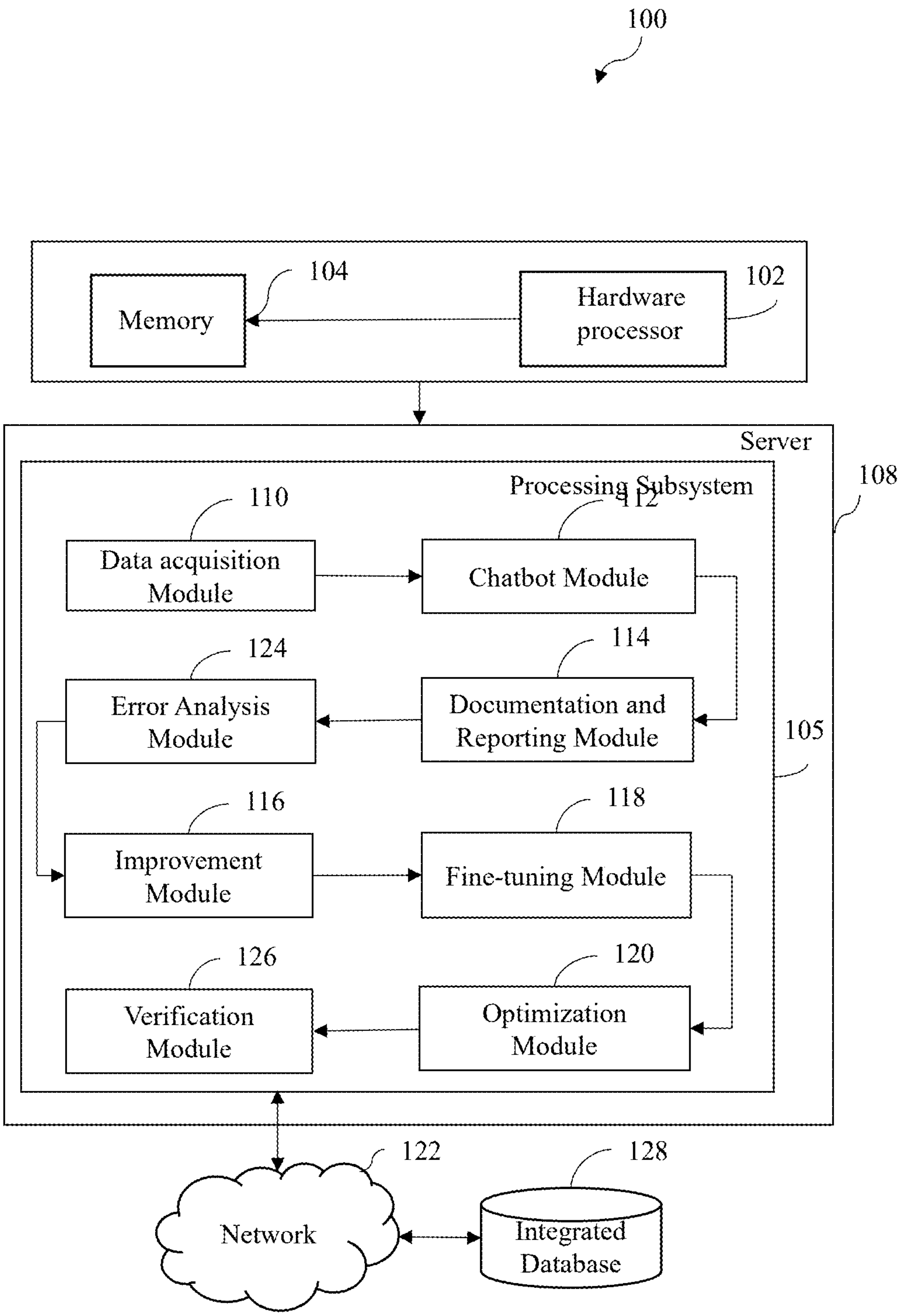
FIG. 2 is a schematic representation of an exemplary embodiment of the computer-implemented system for managing post data migration of FIG. 1 in accordance with an embodiment of the present disclosure.

FIG. 2 is a schematic representation of an exemplary embodiment of the computer-implemented system for managing post migration of FIG. 1 in accordance with an embodiment of the present disclosure. The system of FIG. 1 includes a processing subsystem 105 including a data acquisition module 110, a chatbot module 112, a documentation and reporting module 114, an improvement module 116, a fine-tuning module 118 and an optimization module 120. In one embodiment, the processing subsystem 105 also includes an error analysis module 124 and a verification module 126.

Further, the error analysis module 124 is operatively coupled to the documentation and reporting module and configured to analyze errors that occurred during the data migration. The error analysis module 124 is also configured to provide automated remediation plans based on the errors. Further, the errors can stem from human expertise required to complete complex server work, the need for precise timing of changes, the risk of error, complexity of the data being gathered, and the architecture of the system itself.

Additionally, the verification module 126 is operatively coupled to the optimization module and configured to test one or more migrated components based on functionality. In one embodiment, the verification module 126 is configured to verify if the data migration was successful or a failure. Specifically, the verification module 126 may examine the log file to determine if all the jobs were completed successfully. For example, a data transfer may have been interrupted and the remaining data may need to be migrated in order to ensure that the complete data set has been migrated. It must be noted that the log file is generated by servers, applications and network devices. Further, the log file includes historical usage patterns, performance metrics, error records, and other critical insights that inform the migration strategy.

For example, consider a scenario in which a source environment includes a record X, a record Y, a database M and a database N. The record X depends on the database M and the record Y depends on the database N. The data has been moved from the source environment to the cloud based on a migration plan. However, there has been an error during the migration wherein record Y data has not been moved due to an interruption. Several inputs pertaining to the data migration is received. The inputs include infrastructure inventory, application logs, application configuration, database inventory, database logs, security and compliance report and backup configuration report. Based on the nature of the error and the inputs, the elements that were involved in the failure of the migration is determined. The elements can be hardware, software or firmware components. A chatbot aids a user to provide on-demand support during and post the migration. Based on these elements, documents and reports are generated using an artificial intelligence model. Further, the documents and reports are analyzed to provide corrective actions for the failure of migrating record Y. It may be recommended to migrate record Y between 10-12 pm on any day. Additionally, this recommendation is used to fine-tune the process for subsequent migration waves. Further, the cloud is analyzed to identify areas for improvement, such as right-sizing instances, optimizing storage, and adjusting configurations based on usage patterns thereby managing post data migration.

Figure 3:
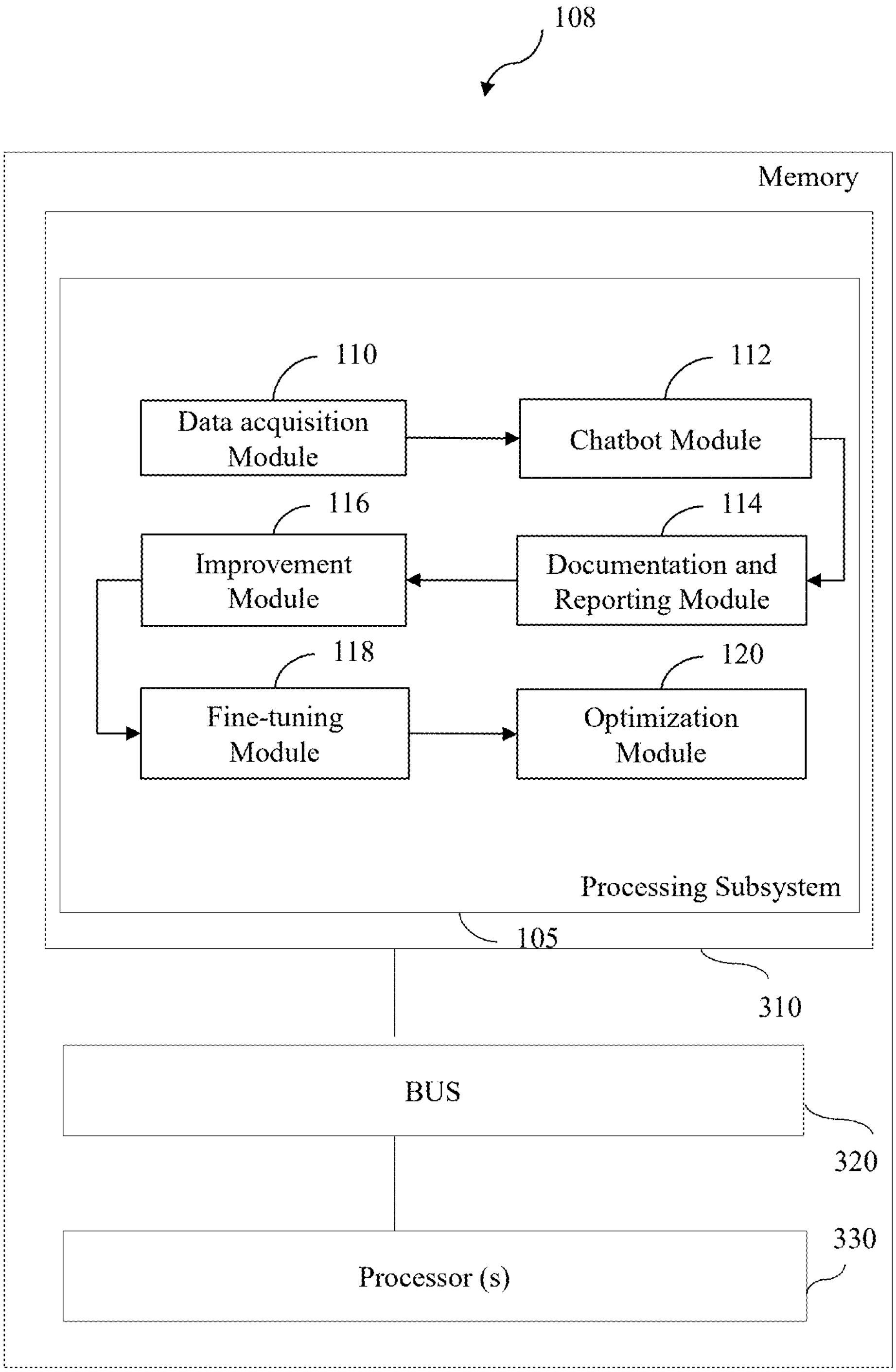
FIG. 3 is a block diagram of a computer or a server in accordance with an embodiment of the present disclosure.

FIG. 3 is a block diagram of a computer or a server in accordance with an embodiment of the present disclosure. The server 108 includes processor(s) 330, and memory 310 operatively coupled to the bus 320. The processor(s) 330, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 310 includes several subsystems stored in the form of computer-readable medium which instructs the processor to perform the method steps illustrated in FIG. 1. The memory 310 includes several subsystems stored in the form of an executable program which instructs the processor 330 to perform the method steps illustrated in FIG. 1. The memory 310 includes a processing subsystem 105 of FIG. 1. The processing subsystem 105 further has following modules: a data acquisition module 110, a chatbot module 112, a documentation and reporting module 114, an improvement module 116, a fine-tuning module 118 and an optimization module 120.

The data acquisition module 110 is configured to receive a plurality of inputs as a result of post migration. The plurality of inputs comprises infrastructure inventory, application logs, application configuration, database inventory, database logs, security and compliance report and backup configuration report. The chatbot module 112 is operatively coupled to the data acquisition module wherein the chatbot module 112 is configured to provide on-demand support to a user during and post the migration. The documentation and reporting module 114 is operatively coupled to the chatbot module 112 wherein the documentation and reporting module 114 is configured to generate a document and report of the migration using an artificial intelligence model. The improvement module 116 is operatively coupled to the documentation and reporting module 114 wherein the improvement module 116 is configured to perform a continuous improvement loop after each stage of the migration to analyze the efficiency of the migration and provide corrective actions. The fine-tuning module 118 is operatively coupled to the improvement module 116 wherein the fine-tuning module 118 is configured to fine-tune the process for subsequent migration waves. The optimization module 120 is operatively coupled to the fine-tuning module 118 wherein the optimization module 120 is configured to constantly analyze a cloud platform environment to identify areas for improvement, such as right-sizing instances, optimizing storage, and adjusting configurations based on usage patterns thereby managing post migration.

The bus 320 as used herein refers to internal memory channels or computer network that is used to connect computer components and transfer data between them. The bus 320 includes a serial bus or a parallel bus, wherein the serial bus transmits data in bit-serial format and the parallel bus transmits data across multiple wires. The bus 320 as used herein may include but not limited to, a system bus, an internal bus, an external bus, an expansion bus, a frontside bus, a backside bus, and the like.

[1] Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 330.

While computer-readable medium is shown in an example embodiment to be a single medium, the term "computer-readable medium" should be taken to include a single medium or multiple media (for example, a centralized or distributed database, or associated caches and servers) able to store the instructions. The term "computer readable medium" shall also be taken to include any medium that is capable of storing instructions for execution by the machine and that cause the machine to perform any one or more of the methodologies disclosed herein. The term "computer-readable medium" includes, but not to be limited to, data repositories in the form of solid-state memories, optical media, and magnetic media.

Figure 4:
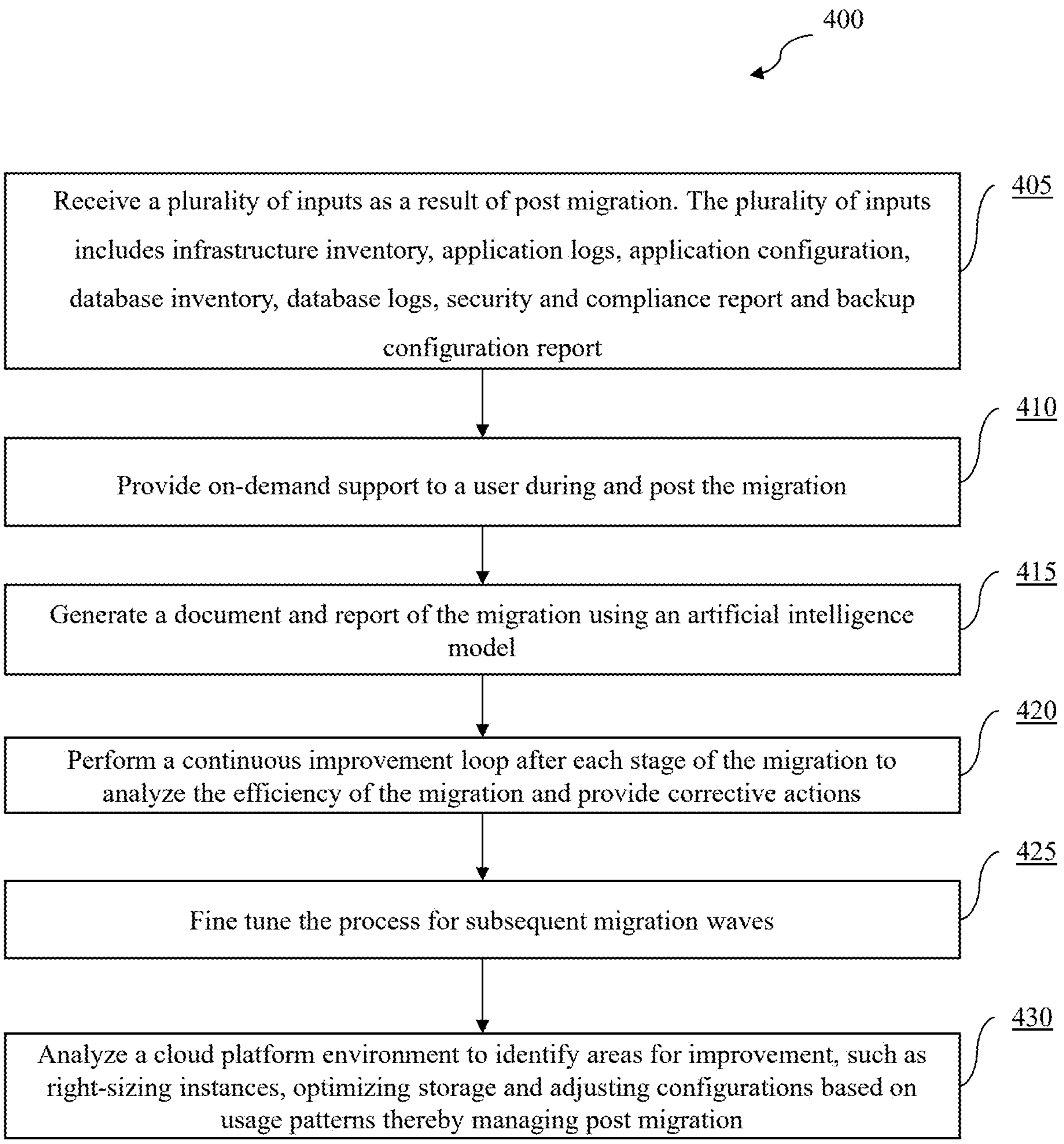
FIG. 4 is a flow chart representing the steps involved in a method for managing post data migration in accordance with an embodiment of the present disclosure.

FIG. 4 illustrates a flow chart representing the steps involved in a computer-implemented method for managing post migration in accordance with an embodiment of the present disclosure. The method 400 starts at step 405.

At step 405, the computer-implemented method 400 includes receiving, by a data acquisition module of a processing subsystem, a plurality of inputs as a result of post migration. The plurality of inputs comprises infrastructure inventory, application logs, application configuration, database inventory, database logs, security and compliance report and backup configuration report. In one embodiment, the plurality of inputs are received through a user interface.

At step 410, the computer-implemented method 400 includes providing, by a chatbot module of the processing subsystem, on-demand support to a user during and post the migration. In one embodiment, the chatbot module is configured to constantly provide answers to queries, documentations and assists the user with a plurality of tasks. In one embodiment, the on-demand support is provided via an on-demand chat interface configured to display documents and reports of the migration.

Further, in one embodiment, the on-demand support is provided via an on-demand chat interface configured to display the document and reports of the data migration.

At step 415, the computer-implemented method 400 includes generating, by a document and reporting module of the processing subsystem, a document and report of the migration using an artificial intelligence model. In one embodiment, the artificial intelligence model is a generative artificial intelligence model. In another embodiment, the artificial intelligence model is a Large Language Model. Further, the artificial intelligence model is trained with data from past data migration waves to make precise predictions.

The document and report of the migration comprises timelines, resource configurations and performance metrics. Additionally, the document and report of the migration are migration report, error report, fine tuning report, security and compliance report, resource configurations and retrospective analysis.

In one embodiment, the documents and reports are stored in an integrated database. Additionally, store inventory and logs of the data migrations are also stored in the integrated database. In such an embodiment, the integrated database is one of a structured query language database, non-structured query language database and a sequential database.

In one embodiment, the method 400 includes analyzing errors that occurred during the data migration. In such an embodiment, automated remediation plans are provided based on the errors.

At step 420, the computer-implemented method 400 includes performing, by an improvement module of the processing subsystem, a continuous improvement loop after each stage of the migration to analyze the efficiency of the migration and provide corrective actions.

At step 425, the computer-implemented method 400 includes fine-tuning, by a fine-tuning module of the processing subsystem, the process for subsequent migration waves. In one embodiment, the fine tuning of subsequent migration waves is based on size of the migration wave, complexity of the migration wave, available resources and requirements of a destination environment.

At step 430, the computer-implemented method 400 analyzes, by an optimization module of the processing subsystem, a cloud platform environment to identify areas for improvement, such as right-sizing instances, optimizing storage, and adjusting configurations based on usage patterns thereby managing post migration. In one embodiment, the data migration is constantly reviewed at pre-determined time intervals. In such an embodiment, one or more changes are made based on the review.

In one embodiment, the method 400 includes testing one or more migrated components based on functionality. In such an embodiment, the method 400 verifies whether the data migration was a success or a failure.

The method 400 ends at step 430.

Various embodiments of the computer-implemented system and method managing post data migration provides several benefits. One such benefit is that the post migration documents and reports are time efficient and are not prone to errors and data corruption enabled by the artificial intelligence model. Further, the on-demand support provided by the chatbot facilitates the user to analyze the migration in real-time and is user-friendly. Furthermore, fine-tuning module and optimization module ensures that subsequent migration waves are not prone to errors thereby making the process of data migration cost effective. Analyzing data migration allows to identify potential risks associated with the process. Therefore, by understanding these risks beforehand, proactive measures can be taken to mitigate them and ensure a smooth migration process. Additionally, analyzing data migration offers performance enhancement, compliance and governance adherence and scalability.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application-specific integrated circuits (ASICs), field-programmable gate arrays (FPGAs), or any other equivalent integrated or discrete logic circuitry, as well as any combinations of such components. The term "processor" or "processing subsystem" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A computer-implemented system for management of post data migration comprising:

a hardware processor; and a memory coupled to the hardware processor, wherein the memory comprises a set of program instructions in the form of a processing subsystem, configured to be executed by the hardware processor, wherein the processing subsystem hosted on a server and configured to execute on a network to control bidirectional communications among a plurality of modules comprising:

a data acquisition module configured to receive a plurality of inputs as a result of post data migration wherein the plurality of inputs comprises infrastructure inventory, application logs, application configuration, database inventory, database logs, security and compliance report and backup configuration report;

a chatbot module operatively coupled to the data acquisition module wherein the chatbot module is configured to provide on-demand support to a user during and post the data migration;

a documentation and reporting module operatively coupled to the chatbot module wherein the documentation and reporting module is configured to generate a document and report of the data migration using an artificial intelligence model, wherein the document and report of the data migration comprises timelines, resource configurations and performance metrics, wherein the document and report of the data migration are migration report, error report, fine tuning report, security and compliance report, resource configurations and retrospective analysis;

an improvement module operatively coupled to the documentation and reporting module wherein the improvement module is configured to perform a continuous improvement loop after each stage of the data migration to analyze the efficiency of the data migration and provide corrective actions, a fine-tuning module operatively coupled to the improvement module wherein the fine-tuning module is configured to fine-tune the process for subsequent migration waves, wherein the fine tuning of the subsequent migration waves is based on size of the migration wave, complexity of the migration wave, available resources and requirements of a destination environment; and an optimization module operatively coupled to the fine-tuning module wherein the optimization module is configured to constantly analyze a cloud platform environment to identify areas for improvement, wherein the areas for improvement comprise right-sizing instances, optimizing storage, and adjusting configurations based on usage patterns thereby managing post data migration.

2. The computer-implemented system of claim 1, further comprising an error analysis module operatively coupled to the documentation and reporting module wherein the error analysis module is configured to:

analyze errors that occurred during the data migration; and provide automated remediation plans based on the errors.

3. The computer-implemented system of claim 1, comprising an on-demand chat interface configured to display the said document and report.

4. The computer-implemented system of claim 1, wherein the document and report are stored in an integrated database.

5. The computer-implemented system of claim 1, wherein the chatbot module is configured to constantly provide answers to queries, documentations and assists the user with a plurality of tasks.

6. The computer-implemented system of claim 1, comprising a verification module operatively coupled to the optimization module wherein the verification module is configured to test one or more migrated components based on functionality.

7. The computer-implemented system of claim 6, wherein the verification module is configured to verify success or failure of the data migration.

8. The computer-implemented system of claim 1, wherein the optimization module is configured to constantly review the data migration at pre-determined time intervals.

9. The computer-implemented system of claim 8, wherein the optimization module is configured to make one or more changes based on the review.

10. The computer-implemented system of claim 1, wherein the artificial intelligence model is configured with generative artificial intelligence.

11. The computer-implemented system of claim 1, wherein the artificial intelligence model is a Large Language Model.

12. The computer-implemented system of claim 1, wherein the artificial intelligence model is trained with data from past data migration waves to make precise predictions.

13. The computer-implemented system of claim 1, comprises an integrated database to store inventory and logs of the data migrations.

14. The computer-implemented system of claim 13, wherein the integrated database in one of a structured query language database, non-structured query language database and a sequential database.

15. The computer-implemented system of claim 1, wherein the plurality of inputs are received through a user interface.

16. A computer-implemented method for management of post migration comprising:

receiving, by a data acquisition module of a processing subsystem, a plurality of inputs as a result of post migration wherein the plurality of inputs comprises infrastructure inventory, application logs, application configuration, database inventory, database logs, security and compliance report and backup configuration report;

providing, by a chatbot module of the processing subsystem, on-demand support to a user during and post the migration;

generating, by a document and reporting module of the processing subsystem, a document and report of the migration using an artificial intelligence model, wherein the document and report of the migration comprises timelines, resource configurations and performance metrics, wherein the document and report of the migration are migration report, error report, fine tuning report, security and compliance report, resource configurations and retrospective analysis;

performing, by an improvement module of the processing subsystem, a continuous improvement loop after each stage of the migration to analyze the efficiency of the migration and provide corrective actions;

fine-tuning, by a fine-tuning module of the processing subsystem, the process for subsequent migration waves, wherein the fine tuning of the subsequent migration waves is based on size of the migration wave, complexity of the migration wave, available resources and requirements of a destination environment; and analyzing, by an optimization module of the processing subsystem, a cloud platform environment to identify areas for improvement, wherein the areas for improvement comprise right-sizing instances, optimizing storage, and adjusting configurations based on usage patterns thereby managing post migration.

17. A non-transitory computer-readable medium storing a computer program that, when executed by a processor, causes the processor to perform a computer-implemented method for management of post migration, wherein the computer-implemented method comprises:

receiving, by a data acquisition module of a processing subsystem, a plurality of inputs as a result of post migration wherein the plurality of inputs comprises infrastructure inventory, application logs, application configuration, database inventory, database logs, security and compliance report and backup configuration report;

providing, by a chatbot module of the processing subsystem, on-demand support to a user during and post the migration;

generating, by a document and reporting module of the processing subsystem, a document and report of the migration using an artificial intelligence model, wherein the document and report of the migration comprises timelines, resource configurations and performance metrics, wherein the document and report of the migration are migration report, error report, fine tuning report, security and compliance report, resource configurations and retrospective analysis;

performing, by an improvement module of the processing subsystem, a continuous improvement loop after each stage of the migration to analyze the efficiency of the migration and provide corrective actions;

fine-tuning, by a fine-tuning module of the processing subsystem, the process for subsequent migration waves, wherein the fine tuning of the subsequent migration waves is based on size of the migration wave, complexity of the migration wave, available resources and requirements of a destination environment; and analyzing, by an optimization module of the processing subsystem, a cloud platform environment to identify areas for improvement, wherein the areas for improvement comprise right-sizing instances, optimizing storage, and adjusting configurations based on usage patterns thereby managing post migration.

* * * * *